Figure 1:
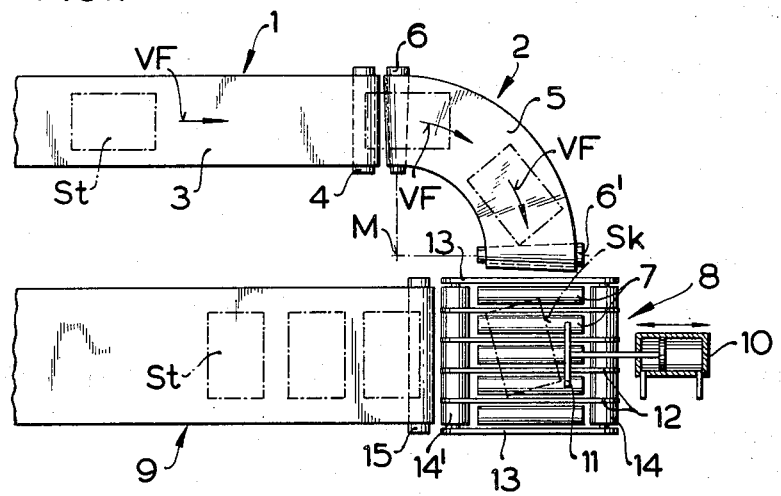

United States Patent [19]

Brockmuller

[11] 3,823,811
[45] July 16, 1974

[54] CONVEYOR MEANS FOR PAPER OR PLASTICS TUBE SECTIONS IN THE MANUFACTURE OF BAGS

[75] Inventor: Friedrich Franz Brockmuller, Lengerich of Westphalia, Germany

[73] Assignee: Windmoller & Holscher, Lengerich of Westphalia, Germany

[22] Filed: Dec. 5, 1972

[21] Appl. No.: 312,354

[30] Foreign Application Priority Data
Dec. 7, 1971  Germany............................ 2160709

[52] U.S. Cl................ 198/29, 198/33 AB, 198/105, 198/182, 198/194
[51] Int. Cl............................................. B65g 47/22
[58] Field of Search......... 198/29, 33 AB, 182, 194, 198/105

[56] References Cited
UNITED STATES PATENTS

| 2,234,537 | 3/1941  | Blackburn........................ 198/182 |
| 2,413,339 | 12/1946 | Stadelman ........................ 198/182 |
| 2,785,785 | 3/1957  | Macaluso............................. 198/21 |
| 2,986,262 | 5/1961  | Powers................................. 198/29 |
| 3,086,640 | 4/1963  | Verrinder....................... 198/33 AB |
| 3,355,343 | 11/1967 | Beck................................. 198/193 |
| 3,538,974 | 11/1970 | Marzocchi......................... 198/193 |

Primary Examiner—Richard A. Schacher
Assistant Examiner—Richard K. Thomson
Attorney, Agent, or Firm—Fleit, Gipple & Jacobson

[57] ABSTRACT

A mechanism for correcting errors in the positions of stacks of flattened paper or plastics tube sections travelling on a belt conveyor followed by a curved wire belt conveyor. The errors caused by differences in the coefficients of friction between the stacks and the successive conveyors, are corrected by an aligning mechanism in the form of at least one transverse slide positioned downstream of the curved conveyor.

4 Claims, 2 Drawing Figures

CONVEYOR MEANS FOR PAPER OR PLASTICS TUBE SECTIONS IN THE MANUFACTURE OF BAGS

The invention relates to conveyor means for stacks of flattened tube sections of paper or plastics film in the manufacture of bags, comprising a curved wire belt conveyor for changing the direction of travel of the stacks and a belt conveyor having a slip-resistant surface.

In tube-making machines having a stacking station for the flattened tube sections and a conveyor for feeding the stacks of flattened tube sections to a base closure-forming machine, it is usually necessary to subject the stacks of tube sections leaving the tube-making machine to a change in direction. This change in direction is necessary because it is hardly possible to provide in a factory of the usual length an arrangement of bag-making machines in which the tube-making machines with stacking stations, the conveyor leading from the stacking station and used as a drying path, and the subsequent base closureforming machines are placed one behind the other in a straight line. Usually, the tube-making machines and the base closure-forming machines are situated side-by-side parallel to one another and the stacks of flattened tube sections must undergo a change in direction of 180°.

The usual conveyor means for transporting the stacks from the stacking station of the tube-making machine comprise a belt conveyor comprising a belt which extends across the entire width of the conveyor or a plurality of parallel belts. The belts are of textile material and at least their surfaces are provided with a slip-resistant coating so that the stacks will be more reliably carried thereby.

Preferred direction-changing means for the stacks comprise a curved wire belt conveyor by which the stacks are subjected to a feeding force across the entire width of the conveyor so that buckling and creasing of the lowermost tube sections of the stack will be avoided even if the tube material is flimsy. Usually, each curved belt conveyor changes the direction of the stacks by 90°.

When a stack passes from the textile belt conveyor to the curved wire belt conveyor that is disposed immediately downstream thereof, the portion of the stack in contact with the textile conveyor belt and the portion in contact with the wire conveyor belt will be subjected to different feeding forces by reason of the differences in the coefficient of friction and consequently the stack will not be correctly orientated when it is disposed entirely on the curved conveyor because the trailing end of a stack of which the leading end is already located on the curved conveyor cannot be displaced laterally (as would be necessary for correct orientation) in view of the slip-resistant surface of the textile conveyor. Each stack will therefore arrive at the base closure-forming machine at an incorrect angle instead of having its sides parallel with the longitudinal edges of the conveyor. On the other hand, it is not possible to dispense with the slip-resistant surface on the textile belt conveyor, especially if the latter is being moved at a fairly fast speed or at an inclination.

The invention aims to provide conveyor means which reliably eliminates the inevitable errors in orientation when a stack passes onto a curved conveyor.

According to the invention, conveyor means for stacks of flattened tube sections of paper or plastic film in the manufacture of bags comprise a curved wire belt conveyor for changing the direction of travel of the stacks, a belt conveyor having a slip-resistant surface and located upstream of the curved conveyor, and aligning means downstream of the curved conveyor for correcting errors in the positions in which the stacks are conveyed.

By means of the invention, it is possible to provide a slip-resistant surface on a belt conveyor right up to immediately upstream of the curved conveyor. Errors in orientation of the stacks before they reach the curved conveyor will be just as reliably eliminated as those errors caused by the transfer of the stacks to the curved belt conveyor. Alignment of the stacks after their direction of travel has been changed is particularly advantageous because the alignment can be performed independently of the actual error in orientation, which may differ from stack-to-stack. Further, downstream of the curved conveyor there are lower frictional forces that tend to counteract the alignment.

The aligning means preferably comprise at least one transverse slide adapted to act on a side of successive stacks, namely a side that is most nearly parallel to the direction in which the stack is being conveyed. In this way each stack will be aligned without damaging the side edges of the tube sections. Movement of the slide can be initiated by means of a sensor for successive stacks so that damage of the tube section edges forming the start of a stack is avoided. Since in each stack the individual tube sections are superposed in registry with one another, a face with which the slide engages each stack will make contact with most of the longitudinal edges of all the tube sections in that stack, this again avoiding possible damage of the tube sections. Further, the transverse slide will correct any displacement that may have occurred for the upper tube sections in the stack under centrifugal force as the stack was being transported by the curved conveyor.

Preferably, the slide is mounted adjacent a driven roller track provided downstream of the curved conveyor. By reason of the relatively low coefficient of friction between the roller conveyor and the stacks conveyed thereby, alignment of the stacks when located on the roller conveyor should require little force. In addition, the roller track may be a component of a so-called corner conveyor which changes the direction of travel of the stacks by 90° by feeding the stacks side-on if they arrived end-on, or end-on if they arrived side-on. Apart from the roller track, the drive for which can be switched on and off when desired and which can be raised or lowered, such a corner conveyor comprises conveyor elements which are disposed between the rollers and which, when the roller track has been lowered, convey the stacks in a direction parallel to the roller axes. The combination of a transverse slide with such a corner conveyor is particularly advantageous because it saves the provision of an additional conveyor section at which the alignment can be effected.

The transverse slide may be operated by pressure cylinder means the movement of which, as already mentioned, is preferably initiated by sensing means actuated by each stack as it arrives. This ensures particularly efficient alignment because the slides will operate at the appropriate time regardless of what the spacing between successive stacks may be. By simply throttling the pressure medium in the cylinder, the force exerted by the slide on each stack can be adjusted to one that will not damage the tube sections.

Two examples of the invention will now be described with reference to the accompanying diagrammatic drawings in which FIG. 1 is a plan view of one embodiment of the conveyor invention.

Figure 2:
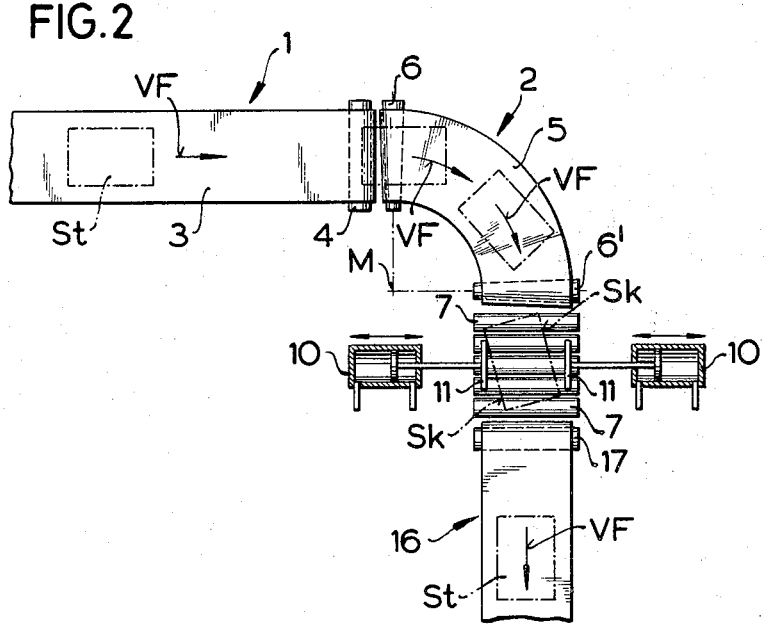

FIG. 2 is a plan view of another embodiment of the conveyor invention.

Stacks St of flattened tube sections are supplied from the stacking station of a tube-making machine along a belt conveyor 1, from which they are transferred to a curved conveyor 2 which changes the direction of travel of the stacks through 90°.

The conveyor 1 is provided with an endless belt 3 made of woven textile material and provided at its surface with a slipresistant coating. Along the conveyor 1, the stacks are moved end-on in a straight line. The direction of travel is then changed along the curved conveyor 2 which comprises a wire belt 5. The delivery end of the conveyor 1 comprises a directionchanging roll 4 about which the endless belt 3 is passed. The conveyor 1 as well as the subsequent conveyor sections are mounted in a rigid frame (not shown) and driven at a speed VF which, in the case of the curved conveyor 2, is assumed to be the mean speed of the belt 5. The latter is passed about tapered directionchanging rolls 6 and 6' and suitable guide means (not shown) are provided to force the belt 5 to travel along an arcuate path of which the center of curvature is at the intersection M of the rotary axes of the direction-changing rolls 6 and 6'.

In practice, the stacks St do not in fact describe a precise arcuate path and consequently the stacks will not be correctly oriented. As a stack is transferred from the conveyor 1 to the conveyor 2, different forces are exerted on the stack by the respective belts 3 and 5 owing to the differences in their coefficients of friction. What happens is that there will be some slip between the stack and the belt 5 as the stack is still being partly conveyed in a straight line by the belt 3. The resultant error in the orientation of each stack is apparent at the leading end of the stack which will be more radially outwardly disposed than the trailing end of the stack and this error in the orientation is maintained as the stack reaches a subsequent roller track 7.

In the FIG. 1 embodiment, the roller track 7 is a component of a corner roller conveyor 8 and can be raised and lowered. The corner conveyor also comprises conveyor elements 12 disposed between the rollers for subsequently transporting each stack side-on along a conveyor belt 9.

When a stack has left the curved conveyor 2 and is disposed exclusively on the roller track 7, it actuates a switch (not shown) which stops the drive for the rollers of the roller track and actuates a compressed air cylinder 10 so that a cylinder therein moves a lateral slide 11 towards the inclined side edge Sk of the stack. This causes the stack to be rotated on the roller track until the edge Sk is flush with the surface of the slide 11.

After such alignment, the roller track is lowered so that the stack will now be moved along the lower transverse conveying elements towards the conveyor 9. In the illustrated embodiment, the transverse conveyor elements consist of a plurality of endless V-belts 12 led over driven direction-changing rolls 14, 14' which are mounted for rotation in a frame 13.

The conveyor 9 comprises an endless belt passing over a direction-changing roll 15 and leads to a group of base closure-forming machines. The V-belts are not critical to the proper operation of the corner conveyor 8 and may be replaced by disc feeders.

In FIG. 2, each stack St is transported end-on in a straight line after leaving the curved conveyor 2. Alignment is effected on the roller track 7, after the latter has been switched off by sensing means, in much the same way as already described in relation to FIG. 1, except that in this case there are two transverse slides 11 to ensure that each stack is orientated to lie on the centerline of a downstream conveyor 16. The application of both slides 11 to the longitudinal edges Sk of each stack is effected simultaneously without damaging the tube sections because for both cylinders 10 there is an abutment (not shown) for setting the most favourable end position that is to be assumed by the slides 11. If the abutments have been set correctly, the aligned stack will be centrally located on the roller track 7 without the need for exerting any greater forces on the stack than in the case of FIG. 1 where only a single slide 11 is provided.

Upon completion of alignment, the slides 11 are retracted from the roller conveyor, the latter is started again and the aligned stack is transferred to the conveyor 16 of which a direction-changing roll 17 is disposed immediately downstream of the roller track. The conveyor 16 feeds the successive stacks to a group of base closure-forming machines (not shown). The transverse slide unit and roller track forming the means for aligning the stacks in FIG. 2 are compact and constitute reliable means for aligning the stacks along a conveyor section where the stacks are moved in a straight line.

I claim:

1. Conveyor means for transferring stacks of tubing sections made of paper or plastic comprising a curved wire belt conveyor for changing the direction of travel of the stacks, a belt conveyor having a slip-resistant surface positioned upstream of the curved wire belt conveyor; a roller conveyor positioned downstream of said wire belt conveyor and aligning means for correcting defects in the orientation in which the stacks are conveyed, said aligning means being located in the region of the roller conveyor downstream of said curved wire belt conveyor, said aligning means comprising a transverse slide which acts sideways on the conveyed tubing sections stack and is oriented parallel to the conveying direction; and conveying means installed in the region of the transverse slide between the rollers of the roller conveyor stretch so as to convey stacks transversely to the primary conveying direction.

2. Conveyor means according to claim 1, comprising sensing means to sense the conveying orientation and initiate movement of said transverse slide.

3. Conveyor means according to claim 1, wherein the transverse slide is operated by pressure cylinder means.

4. Conveyor means according to claim 1 wherein said roller conveyor is raisable and lowerable.

* * * * *